United States Patent

Chu et al.

Patent Number: 5,257,863
Date of Patent: Nov. 2, 1993

[54] ELECTRONIC ROTOR TEMPERATURE SENSOR

[75] Inventors: Frank Y. Chu; Blake A. Lloyd; Robert M. Cilic; Howard G. Sedding, all of Ontario, Canada

[73] Assignee: Electric Power Research Institute, Inc, Palo Alto, Calif.

[21] Appl. No.: 922,141

[22] Filed: Jul. 30, 1992

[51] Int. Cl.$^5$ .................. G01K 1/14; G01K 13/08
[52] U.S. Cl. ................ 374/153; 340/870.17; 318/490; 374/208
[58] Field of Search ............... 374/152, 153, 154, 166, 374/179, 180, 183, 208; 310/68 C; 318/490; 73/116; 340/870.11, 870.17

[56] References Cited

U.S. PATENT DOCUMENTS

| | | | |
|---|---|---|---|
| 3,713,124 | 1/1973 | Durland et al. | 374/153 |
| 3,731,536 | 5/1973 | Baumann et al. | 374/153 |
| 3,824,857 | 7/1974 | Smith | 374/154 |
| 3,886,787 | 6/1975 | Akatsu et al. | 374/153 |
| 4,150,358 | 4/1979 | Aviander | 374/153 |
| 4,248,095 | 2/1981 | Akatsu et al. | 374/154 |
| 4,435,095 | 3/1984 | Jones et al. | 374/208 |
| 4,518,962 | 5/1985 | Imose et al. | 340/870.17 |

FOREIGN PATENT DOCUMENTS

| | | | |
|---|---|---|---|
| 3425350 | 1/1985 | Fed. Rep. of Germany | 374/153 |
| 003742 | 6/1986 | Fed. Rep. of Germany | 374/153 |

Primary Examiner—William A. Cuchlinski, Jr.
Assistant Examiner—G. Bradley Bennett
Attorney, Agent, or Firm—Flehr, Hohbach, Test, Albritton & Herbert

[57] ABSTRACT

An electronic rotor temperature sensor which is encased in a plug or housing which can be removably mounted in the rotor of a generator or motor and transmit r.f. signals encoded with temperature information.

9 Claims, 2 Drawing Sheets

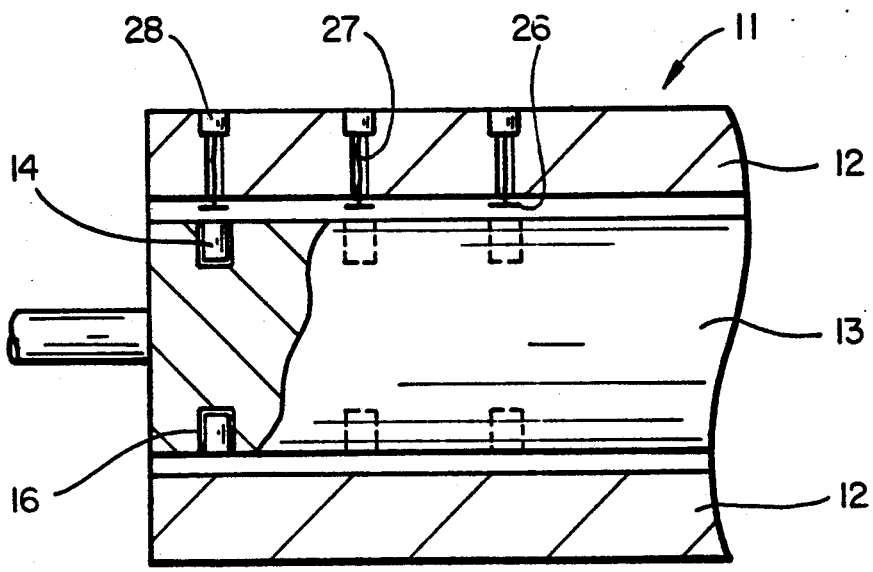
FIG_1
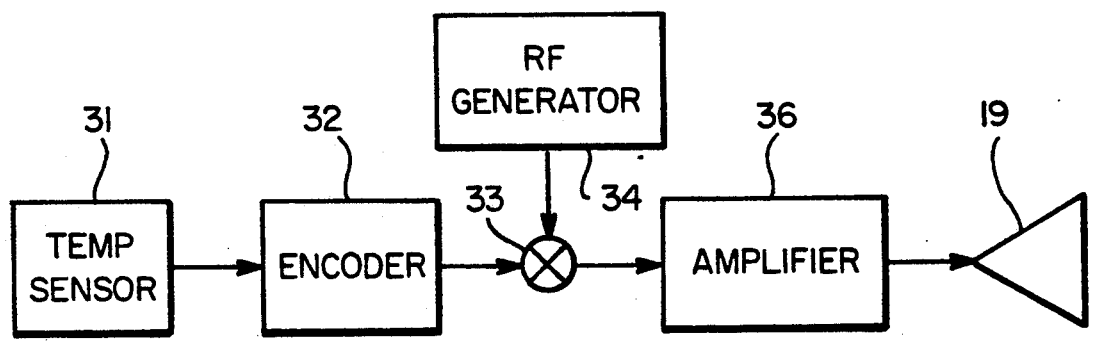
FIG_3

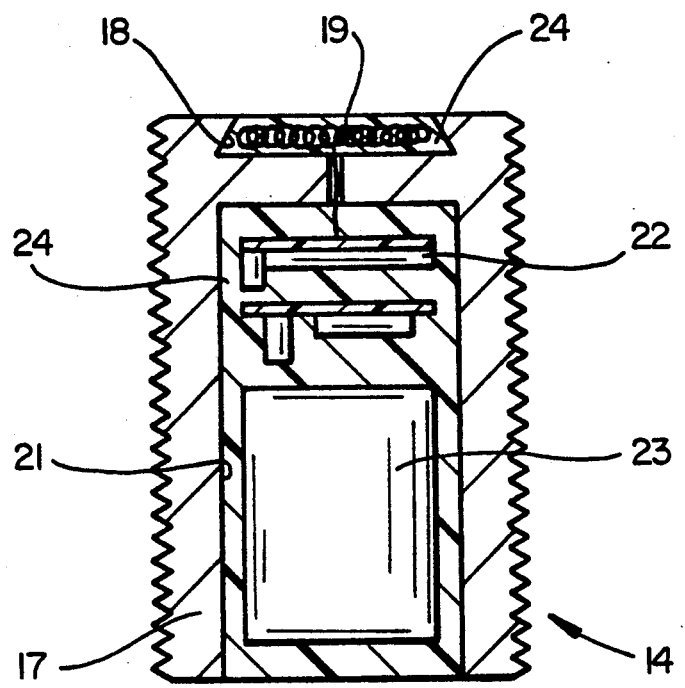
FIG_2
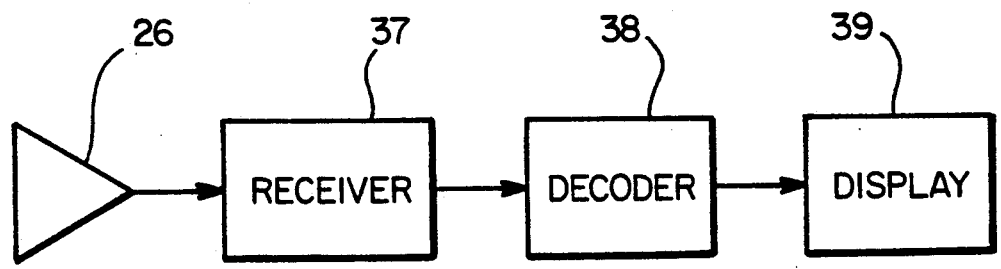
FIG_4

ELECTRONIC ROTOR TEMPERATURE SENSOR

BRIEF DESCRIPTION OF THE INVENTION

This invention relates generally to an electronic rotor temperature sensor, and more particularly, to a self-contained temperature sensor including encoding electronics and radio frequency transmitter adapted to be mounted in the rotor of an electrical generator or motor.

BACKGROUND OF THE INVENTION

The electrical insulation in large motors or generators plays a vital role. Breakdown of this insulation can result in major down time for the machine; in fact, industry surveys show that insulation system failure is one of the major causes of motor breakdowns and generator outages.

In recent years utilities have reactivated their interest in motor and generator insulation conditions because the deferral of new generating capacity places greater emphasis on the reliable operation of older power plants. To effectively maintain motors and generators, utilities need periodic information on the insulation conditions. In addition, continuous condition assessments may be necessary to avoid in-service failures.

The measure of temperature of the stator of a rotating electrical machine presents little difficulty. The measure of temperature in rotors requires the ability to transfer data from the rotating portion of the machine to the stationary portion of the machine.

Slip rings have been used in the past for transfer of data; however, these have not been satisfactory because of wear and electrical interference.

Other systems have employed transformers to transform signals whose frequency is dependent on temperature from the rotor to the stator of the machine. Power has been supplied to the circuits mounted in the rotor by induction. In U.S. Pat. No. 3,824,857 there is described a temperature measuring system in which the output of the thermocouple is used to control the frequency of a voltage-to-frequency converter. In one embodiment, the signal is transformer coupled to a stationary portion of the machine. In another, it is coupled by an FM transmitter and receiver.

None of the prior art systems provide a plug including a temperature sensor and transmitter which can be easily installed in the rotor of a generator or motor.

OBJECTS AND SUMMARY OF THE INVENTION

It is an object of this invention to provide a temperature sensor including a radio frequency transmitter and data encoder in a self-contained plug which can be removably mounted in the rotor of a motor or generator.

It is another object of this invention to provide an electronic rotor temperature sensor which is mounted on the rotor and can withstand high gravitational forces, temperatures and magnetic fields.

It is another object of this invention to provide an electronic remote temperature sensor encased in a plug or housing mounted on the rotor of a rotating machine and a receiver for receiving and decoding signals from said transmitter.

The foregoing and other objects of the invention are achieved by an encased electronic remote temperature sensor which can be removably mounted on the rotor of a motor or generator and which serves to generate encoded radio frequency signals, and an antenna for radiating said signals. A receiver receives and decodes said radiated signals to provide an indication of temperature of the rotor.

BRIEF DESCRIPTION OF THE DRAWINGS

The foregoing and other objects of this invention will be more clearly understood from the following description when read in conjunction with the accompanying drawings, wherein:

FIG. 1 is a partial schematic drawing, partly in section, of an electrical motor or generator with a plurality of electronic remote temperature sensors mounted on the rotor;

FIG. 2 is a sectional view of an electronic remote temperature sensor in accordance with this invention;

FIG. 3 is a schematic block diagram of the means for generating an encoded r.f. signal;

FIG. 4 is a schematic circuit diagram of the receiving system for receiving and decoding the signal and displaying the temperature.

DESCRIPTION OF THE PREFERRED EMBODIMENTS

FIG. 1 shows a generator or motor 11 having a stator 12 and a rotor 13. The rotor includes a plurality of electronic remote temperature sensor assemblies 14 which are removably inserted at spaced locations along the rotor. The remote temperature sensor may, for example, be threadably received in wells 16 formed in the rotor. As illustrated, there are six such electronic remote temperature sensor assemblies with pairs mounted diametrically opposite each other on the rotor for maintaining rotor balance. It will be apparent that more or less electronic temperature sensors may be used.

Referring more particularly to FIG. 2, electronic remote temperature sensors include a plug or housing 17 having an upper chamber 18 which houses antenna 19. The plug includes a lower housing 21 which includes the temperature sensor, encoder and transmitter electronics 22 and a battery 23 for supplying power to the electronic circuits. The transmitter circuit and battery are potted in the housing 21 by using a filled epoxy resin 24. The resin is selected to have a low temperature cure, high deflection temperature and good creep resistance at high compressive stress. The antenna 19 is also potted in a suitable epoxy 26.

The encoded r.f. signal radiated by the antenna 19 is received by monopole antennas 26 installed in the stator bore and end regions of the machine. The antennas 26 are shown placed adjacent the rotor to intercept signals from the electronic remote temperature sensor antennas 19 as they rotate past. The antennas 26 are connected to leads 27 which extend outwardly through radial vent ducts in the stator 12. The leads extend through and are held by connectors 28 which, in the case of hydrogen cooled machines, form a seal to prevent the escape of hydrogen which is usually disposed in the interior of the machines under pressure.

Referring particularly to FIG. 3, the electronic remote temperature sensor may include a temperature sensor 31 such as a thermistor connected in a bridge circuit or thermocouple to provide temperature dependent voltage which is encoded in an encoder circuit 32. The encoder provides an encoded output signal to modulator 33 which modulates the signal from the r.f. generator 34. Preferably, the encoded signal turns modulator 33 on and off, which may be a switch to provide bursts of r.f. whose duration is based on temperature. That is, the r.f. is pulse width modulated. The modulated signal is amplified by amplifier 36 and applied to radiating antenna 19. The modulated signals from the antennas 19 are received by receiving antennas 26 and applied to receiver 37, decoded by decoder 38 and applied to display 39 which displays the temperature of the rotor at each of the plugs.

In accordance with this invention, the electronic remote temperature sensor assemblies or plugs each have r.f. frequency generators which operate at different r.f. frequencies, whereby the receiver can scan over a band of frequencies and receive signals from the individual electronic remote temperature sensors and display the temperature information for each sensor at its location on the rotor.

Thus, there has been provided an electronic remote temperature sensor assembly encapsulated in a plug which can be easily installed at selected locations on a rotor and which provides temperature information which enables monitoring of rotor conditions.

What is claimed is:

1. An electronic rotor temperature sensor for mounting on the rotor of a generator comprising:
   a cylindrical balance plug for maintaining rotor balance which can be removably mounted in said rotor, said plug having an exterior threaded surface for mounting to a well in said rotor, a first end, and interior upper and lower chambers;
   a temperature sensor for generating a signal indicative of rotor temperature;
   means responsive to said temperature indicative signal for generating an r.f. signal which is encoded with said temperature indications,
   a first holding means for maintaining said generating means and said temperature sensor stacked and centrally disposed in said lower chamber,
   an antenna for receiving said encoded r.f. signal and radiating the same, and
   a second holding means for maintaining said antenna centrally disposed in said upper chamber oriented so as to radiate said r.f. signal out from said first end.

2. An electronic rotor temperature sensor as in claim 1 including a battery disposed in said lower chamber for supplying power to the signal generating means.

3. An electronic rotor temperature sensor as in claim 2 in which said battery is maintained centrally disposed in said lower chamber beneath said temperature sensor by said first holding means.

4. An electronic rotor temperature sensor as in claim 3 wherein said first holding means comprises a suitable resin, whereby said battery is potted in said lower chamber beneath said temperature sensor.

5. An electronic rotor temperature sensor as in claim 1 including a receiving antenna for mounting on the stator of said generator or motor to receive the radiated r.f. signal, a receiver for receiving said signal, a decoder for decoding the r.f. signal and means for indicating the temperature.

6. An electronic rotor temperature sensor as in claim 1 wherein said first holding means comprises a suitable resin, whereby said temperature sensor and said generating means are potted in said lower chamber.

7. An electronic rotor temperature sensor as in claim 6 wherein said suitable resin is specifically selected to have low temperature cure, high deflection temperature and good creep resistance at high compressive stress as is found in rotor environments.

8. An electronic rotor temperature sensor as in claim 1 wherein said second holding means comprises a suitable resin, whereby said antenna is potted in said upper chamber.

9. An electronic rotor temperature sensor as in claim 8 wherein said suitable resin is specifically selected to have low temperature cure, high deflection temperature and good creep resistance at high compressive stress as is found in rotor environments.

* * * * *